United States Patent
Kamran et al.

(10) Patent No.: US 11,151,048 B2
(45) Date of Patent: Oct. 19, 2021

(54) HOST-BASED READ PERFORMANCE OPTIMIZATION OF A CONTENT ADDRESSABLE STORAGE SYSTEM

(71) Applicant: Dell Products L.P., Round Rock, TX (US)

(72) Inventors: Lior Kamran, Rishon LeZion (IL); Amitai Alkalay, Kadima (IL)

(73) Assignee: Dell Products L.P., Round Rock, TX (US)

( * ) Notice: Subject to any disclaimer, the term of this patent is extended or adjusted under 35 U.S.C. 154(b) by 11 days.

(21) Appl. No.: 16/663,499

(22) Filed: Oct. 25, 2019

(65) Prior Publication Data
US 2021/0124686 A1    Apr. 29, 2021

(51) Int. Cl.
| G06F 12/0882 | (2016.01) |
| G06F 12/1009 | (2016.01) |
| G06F 12/14   | (2006.01) |
| G06F 12/0817 | (2016.01) |

(52) U.S. Cl.
CPC ...... *G06F 12/0882* (2013.01); *G06F 12/0824* (2013.01); *G06F 12/1009* (2013.01); *G06F 12/1408* (2013.01); *G06F 2212/7201* (2013.01)

(58) Field of Classification Search
CPC .................... G06F 12/1009; G06F 12/0824
See application file for complete search history.

(56) References Cited

U.S. PATENT DOCUMENTS

| 7,444,464 B2 | 10/2008 | Urmston et al. |
| 8,095,726 B1 | 1/2012  | O'Connell et al. |
| 8,214,612 B1 | 7/2012  | Natanzon |
| 8,301,593 B2 | 10/2012 | Hoffmann et al. |

(Continued)

FOREIGN PATENT DOCUMENTS

WO    2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Edward J Dudek, Jr.
(74) *Attorney, Agent, or Firm* — Ryan, Mason & Lewis, LLP

(57) ABSTRACT

An apparatus in one embodiment comprises at least one processing device comprising a processor coupled to a memory, with the processing device being configured to maintain a content-based signature cache for a plurality of data pages. For each of a plurality of read operations to be directed to a distributed content addressable storage (CAS) system, the processing device determines if a data page targeted by the read operation has a corresponding content-based signature in the content-based signature cache. Responsive to the data page having a content-based signature in the content-based signature cache, the processing device identifies a particular storage node that stores the data page in the distributed CAS system, and directs the read operation to the identified storage node using the content-based signature to specify the data page targeted by the read operation. The processing device illustratively comprises a host device coupled to the CAS system over a network.

20 Claims, 6 Drawing Sheets

(56) References Cited

U.S. PATENT DOCUMENTS

| | | | |
|---|---|---|---|
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 10,176,046 | B1 | 1/2019 | Hu et al. |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 10,359,965 | B1 | 7/2019 | Stronge et al. |
| 10,394,485 | B1 | 8/2019 | Chen et al. |
| 10,437,501 | B1 | 10/2019 | Kucherov et al. |
| 10,437,855 | B1 | 10/2019 | Stronge et al. |
| 2005/0125627 | A1* | 6/2005 | Kilian ............ H04L 45/7453 711/202 |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2013/0325824 | A1 | 12/2013 | Shoens |
| 2014/0181016 | A1 | 6/2014 | Whitehead et al. |
| 2015/0378785 | A1 | 12/2015 | Tarasuk-Levin et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0192857 | A1 | 7/2017 | Meiri et al. |
| 2019/0303490 | A1 | 10/2019 | Chen et al. |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

U.S. Appl. No. 15/662,708 filed in the name of Xiangping Chen et al. Jul. 28, 2017 and entitled "Token-Based Data Flow Control in a Clustered Storage System."

U.S. Appl. No. 15/793,121 filed in the name of David Meir et al. Oct. 25, 2017 and entitled "Opportunistic Compression of Replicated Data in a Content Addressable Storage System."

U.S. Appl. No. 15/819,666 filed in the name of Xiangping Chen et al. Nov. 21, 2017 and entitled "Storage System Configured for Controlled Transition between Asynchronous and Synchronous Replication Modes."

U.S. Appl. No. 15/824,536 filed in the name of Christopher Sayles et al. Nov. 28, 2017 and entitled "Storage System with Asynchronous Messaging between Processing Modules for Data Replication."

U.S. Appl. No. 16/037,050 filed in the name of Ying Hu et al. Jul. 17, 2018 and entitled "Storage System with Multiple Write Journals Supporting Synchronous Replication Failure Recovery."

U.S. Appl. No. 16/253,793 filed in the name of Yuval Harduf et al. Jan. 22, 2019 and entitled "Storage System with Data Consistency Checking in Synchronous Replication Using Active Snapshot Set."

U.S. Appl. No. 16/396,897 filed in the name of Anton Kucherov et al. Apr. 29, 2019 and entitled "Storage System with Deduplication-Aware Replication Implemented Using a Standard Storage Command Protocol."

U.S. Appl. No. 16/413,050 filed in the name of Xiangping Chen et al. May 15, 2019 and entitled "Storage System with Coordinated Recovery across Multiple Input-Output Journals of Different Types."

U.S. Appl. No. 16/654,826 filed in the name of David Meiri et al. Oct. 16, 2019 and entitled "Host-Based Acceleration of a Content Addressable Storage System."

U.S. Appl. No. 15/793,147 filed in the name of Ernesto Blanco et al. Oct. 25, 2017 and entitled "Compression Signaling for Replication Process in a Content Addressable Storage."

* cited by examiner

HOST-BASED READ PERFORMANCE OPTIMIZATION OF A CONTENT ADDRESSABLE STORAGE SYSTEM

FIELD

The field relates generally to information processing systems, and more particularly to storage in information processing systems.

BACKGROUND

Various types of content addressable storage (CAS) systems are known. Typical CAS systems allow data pages of one or more logical storage volumes to be accessed using content-based signatures that are computed from content of respective ones of the data pages. Such CAS system arrangements facilitate implementation of deduplication and compression. For example, the storage system need only maintain a single copy of a given data page even though that same data page may be part of multiple logical storage volumes. Although these and other CAS systems typically provide a high level of storage efficiency through deduplication and compression, problems can arise under certain conditions. For example, CAS systems physically store data across storage nodes in accordance with content-based signatures, and therefore in a manner that does not correlate with ranges of logical addresses of the corresponding logical storage volumes. As a result, a given read operation may need to be processed through multiple storage nodes in order to reach the storage node that actually stores the data. Such arrangements can unduly increase the latency of the read operation.

SUMMARY

Illustrative embodiments provide techniques for read performance optimization of a CAS system. For example, some embodiments are configured to ensure that a read operation directed to a particular data page of a given logical storage volume of a distributed CAS system is automatically directed to the appropriate storage node that stores that data page, thereby avoiding multiple hops between multiple different storage nodes of the distributed CAS system, and substantially reducing the latency of the read operation.

Moreover, in some embodiments, by significantly reducing inter-node messaging traffic carried over a mesh network interconnecting the storage nodes of a distributed CAS system, processor utilization and network congestion are reduced and overall system performance is improved.

In one embodiment, an apparatus comprises at least one processing device comprising a processor coupled to a memory. The processing device is configured to maintain a content-based signature cache for a plurality of data pages.

The content-based signature cache illustratively comprises a plurality of entries for respective data pages with each such entry comprising a logical address of its data page and a corresponding content-based signature of that data page, although other cache arrangements can be used. The content-based signatures stored in the content-based signature cache in some embodiments comprise respective hash digests of respective data pages, with a given one of the hash digests being generated by applying a secure hashing algorithm to content of a corresponding one of the data pages. Other types of content-based signatures can be used, such as respective hash handles of the data pages.

For each of a plurality of read operations to be directed to a distributed CAS system, the processing device determines if a data page targeted by the read operation has a corresponding content-based signature in the content-based signature cache. Responsive to the data page having a content-based signature in the content-based signature cache, the processing device identifies a particular storage node that stores the data page in the distributed CAS system, and directs the read operation to the identified storage node using the content-based signature to specify the data page targeted by the read operation.

The processing device illustratively comprises a host device coupled to the CAS system over a network, although other types and arrangements of one or more processing devices can be used.

In some embodiments, the above-noted host device more particularly comprises a multi-path input-output (MPIO) driver configured to control delivery of read operations and write operations, collectively referred to herein as input-output (IO) operations, from the host device to the CAS system over selected ones of a plurality of paths through the network. The paths are illustratively associated with respective initiator-target pairs, with each of a plurality of initiators of the initiator-target pairs comprising a corresponding host bus adaptor (HBA) of the host device and each of a plurality of targets of the initiator-target pairs comprising a corresponding port of the CAS system.

In some embodiments, maintaining a content-based signature cache for a plurality of data pages illustratively comprises sending write operations each targeting one or more data pages to the distributed CAS system, receiving from the distributed CAS system content-based signatures for respective ones of the data pages, and storing the content-based signatures in the content-based signature cache in association with respective logical addresses of the corresponding data pages.

A content-based signature for a particular one of the data pages is illustratively received from the CAS system in an acknowledgement of a corresponding one of the above-noted write operations, although the content-based signatures can be obtained in other ways in other embodiments.

In some embodiments, identifying a particular storage node that stores the data page in the distributed CAS system illustratively comprises using the content-based signature of the data page to access a mapping table that maps content-based signatures to respective ones of a plurality of storage nodes that store the data pages in the distributed CAS system. For example, the mapping table may comprise a hash-to-data mapping table that maps hashes of respective data pages to data modules of respective corresponding storage nodes that store the data pages in the distributed CAS system. The hashes can comprise, for example, hash digests or hash handles of the respective data pages.

The mapping table in some embodiments is obtained from the distributed CAS system using at least one command sent by the processing device to the distributed CAS system. For example, such a command may be sent responsive to at least one of an expiration of a timer used to define a specified interval for requesting an updated mapping table, and a failure of the read operation directed to the identified storage node using the content-based signature to specify the data page targeted by the read operation.

The command illustratively comprises a vendor unique command of a designated storage protocol, such as a SCSI protocol or an NVMe protocol, although other types of commands can be used.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
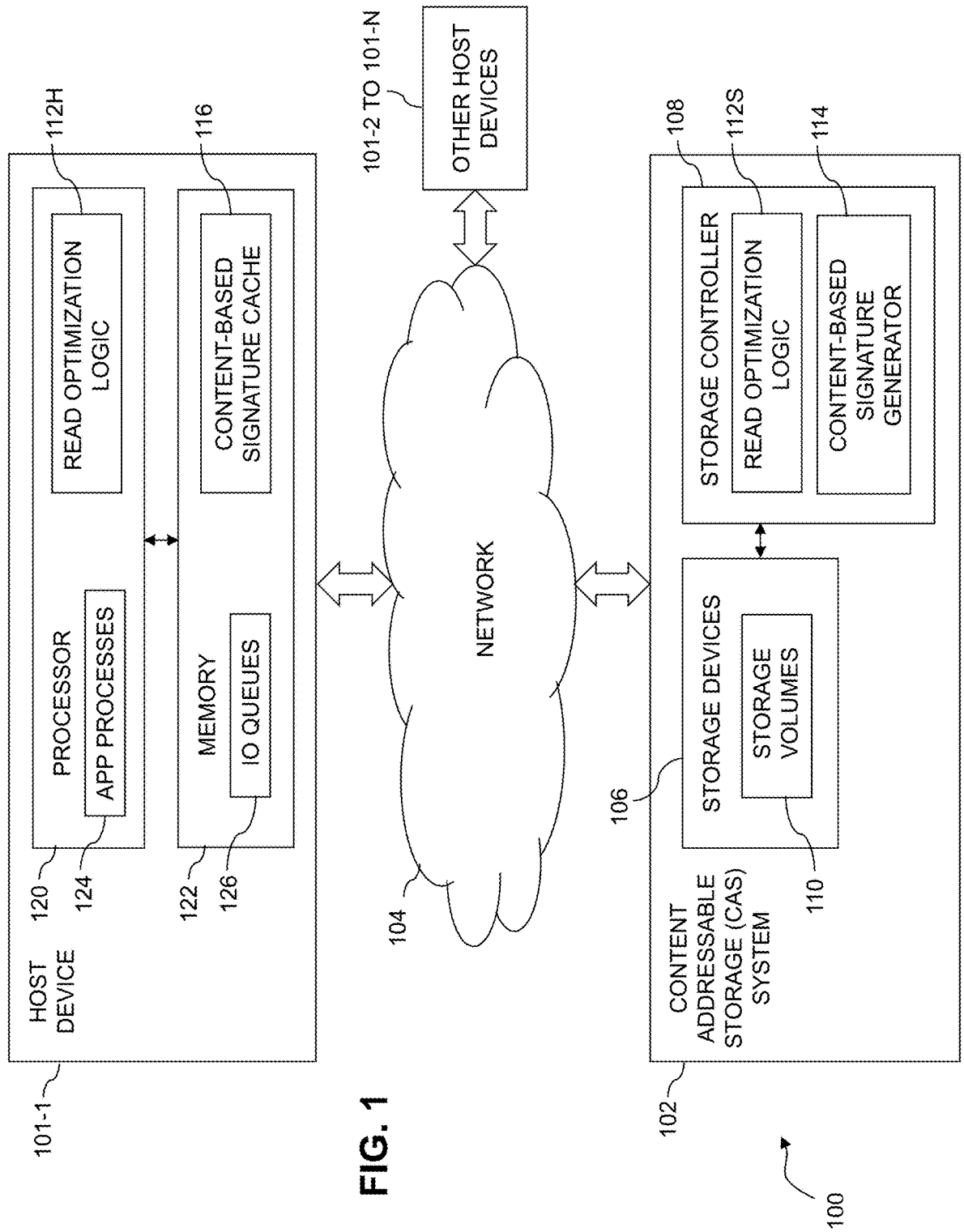
FIG. 1 is a block diagram of an information processing system comprising a host device implementing functionality for host-based read performance optimization of a CAS system in an illustrative embodiment.

FIG. 1 shows an information processing system 100 configured in accordance with an illustrative embodiment. The information processing system 100 comprises a plurality of host devices 101-1, 101-2, . . . 101-N, collectively referred to herein as host devices 101, and a CAS system 102. The host devices 101 are configured to communicate with the CAS system 102 over a network 104.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate input-output (IO) operations that are processed by the CAS system 102. The term "input-output" as used herein refers to at least one of input and output. For example, IO operations may comprise write requests and/or read requests directed to logical addresses of a particular logical storage volume of the CAS system 102. These and other types of IO operations are also generally referred to herein as IO requests.

The CAS system 102 illustratively comprises processing devices of one or more processing platforms. For example, the CAS system 102 can comprise one or more processing devices each having a processor and a memory, possibly implementing virtual machines and/or containers, although numerous other configurations are possible.

The CAS system 102 can additionally or alternatively be part of cloud infrastructure such as an Amazon Web Services (AWS) system. Other examples of cloud-based systems that can be used to provide at least portions of the CAS system 102 include Google Cloud Platform (GCP) and Microsoft Azure.

The host devices 101 and the CAS system 102 may be implemented on a common processing platform, or on separate processing platforms. The host devices 101 are illustratively configured to write data to and read data from the CAS system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The CAS system 102 comprises a plurality of storage devices 106 and an associated storage controller 108. The storage devices 106 store data of a plurality of storage volumes 110. The storage volumes 110 illustratively comprise respective logical units (LUNs) or other types of logical storage volumes.

The storage devices 106 of the CAS system 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in CAS system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the CAS system 102 illustratively comprises a scale-out all-flash content addressable storage array such as an XtremIO™ storage array from Dell EMC of Hopkinton, Mass. A wide variety of other types of storage arrays can be used in implementing a given one of the CAS system 102 in other embodiments, including by way of example one or more VNX®, VIVIAX®, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to CAS systems based on flash memory or other types of NVM storage devices. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 101 and the CAS system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the CAS system 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

A particular one of the host devices 101 is shown in greater detail than the other host devices 101 in FIG. 1. This is the first host device 101-1, which implements functionality for host-based read performance optimization of the CAS system 102 using read optimization logic 112H and content-based signature cache 116. The read optimization logic 112H is illustratively configured to control the performance of a process for host-based read performance optimization of the CAS system 102, such as the example process to be described below in conjunction with FIG. 3. Each of one or more of the other host devices 101 of system 100 can be similarly configured to implement functionality for host-based read performance optimization of the CAS system 102. References herein to "read performance optimization" or "read optimization" are intended to be broadly construed, so as to encompass performance improvements relative to conventional processing of read operations, and should not be viewed as requiring any particular level or levels of read latency or other performance measures.

The storage controller 108 of CAS system 102 in the FIG. 1 embodiment includes read optimization logic 112S for supporting host-based read performance optimization of the CAS system 102 and a content-based signature generator 114. The read optimization logic 112S is illustratively configured to support the performance of a process for host-based read performance optimization of the CAS system 102, such as the example process to be described below in conjunction with FIG. 3. The content-based signature generator 114 is illustratively configured to generate hash digests, hash handles and/or other content-based signatures of respective data pages of the CAS system 102. The storage controller 108 can also include additional elements, such as replication control logic for controlling replication of one or more of the storage volumes 110 to another CAS system not shown in the figure.

The storage controller 108 and the CAS system 102 may further include one or more additional modules and other components typically found in conventional implementations of storage controllers and storage systems, although such additional modules and other components are omitted from the figure for clarity and simplicity of illustration.

The host device 101-1 further comprises a processor 120 coupled to a memory 122. The host device 101-1 is therefore an example of what is more generally referred to herein as a processing device comprising a processor coupled to a memory. The processor 120 executes application ("app") processes 124 of one or more applications on behalf of each of one or more users of the host device 101-1. Such application process execution results in the generation of read operations and write operations that are directed by the host device 101-1 to the CAS system 102 in the manner disclosed herein.

The IO operations generated by the application processes 124 are placed in one or more IO queues 126 to await further processing of the type to be described below. The IO queues 126 are illustratively shown as part of the memory 122 of the host device 101-1, but could be implemented elsewhere in the host device 101-1.

In some embodiments, the host device 101-1 comprises a multi-path input-output (MPIO) driver configured to control delivery of IO operations from the host device 101-1 to the CAS system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device 101-1, and each of a plurality of targets of the initiator-target pairs comprising a corresponding port of the CAS system 102.

The MPIO driver may comprise, for example, an otherwise conventional MPIO driver, such as a PowerPath® driver from Dell EMC, suitably modified in the manner disclosed herein to provide host-based read performance optimization functionality for a CAS system through incorporation of read optimization logic 112H. Other types of MPIO drivers from other driver vendors may be suitably modified to incorporate functionality for host-based read performance optimization of a CAS system as disclosed herein.

The term "MPIO driver" as used herein is intended to be broadly construed, and such a component is illustratively implemented at least in part as a combination of software and hardware. For example, the MPIO driver can comprise one or more software programs running on processor 120 of host device 101-1.

The MPIO driver is configured to deliver IO operations selected from its corresponding IO queues 126 to the CAS system 102 via selected ones of multiple paths over the network 104. The sources of the IO operations stored in the IO queues 126 illustratively include respective application processes 124 of one or more applications executing on the host device 101-1. For example, IO operations can be generated by each of multiple processes of a database application running on the host device 101-1. Such processes issue IO operations for delivery to the CAS system 102 over the network 104. Other types of sources of IO operations may be present in a given implementation of system 100.

In accordance with the above-noted functionality for host-based read performance optimization of the CAS system 102, the host device 101-1 is illustratively configured to maintain the content-based signature cache 116 for a plurality of data pages, and for each of a plurality of read operations to be directed by the host device 101-1 to the CAS system 102, to determine if a data page targeted by the read operation has a corresponding content-based signature in the content-based signature cache 116.

The content-based signatures illustratively comprise respective hash digests of respective data pages with a given one of the hash digests being generated by applying a secure hashing algorithm to content of a corresponding one of the data pages, as is described in more detail elsewhere herein. Other types of content-based signatures can be used, such as respective hash handles of the data pages.

The content-based signature cache 116 illustratively comprises a plurality of entries for respective data pages with each such entry comprising a logical address of its data page and a corresponding content-based signature of that data page, although other cache arrangements can be used in other embodiments.

Responsive to the data page having a content-based signature in the content-based signature cache 116, the host device 101-1 identifies a particular storage node that stores the data page in the CAS system 102, and directs the read operation to the identified storage node using the content-based signature to specify the data page targeted by the read operation.

Responsive to the data page not having a content-based signature in the content-based signature cache 116, the host device 101-1 directs the read operation to the CAS system 102 in the normal way, without identifying a particular storage node that stores the data page in the CAS system 102 and without using the content-based signature to specify the data page targeted by the read operation.

The data pages comprise data pages of one or more of the logical storage volumes 110 of the CAS system 102. The host device 101-1 in directing a read operation to the CAS system 102 illustratively sends one or more corresponding commands to CAS system 102 over a particular path selected by its MPIO driver, although other arrangements can be used. Terms such as "directing a read operation" to a distributed CAS system as those terms are used herein are therefore intended to be broadly construed, and a given such read operation can comprise one or more commands in a particular storage protocol that the host device 101-1 uses to communicate with the CAS system 102.

These and other operations related to host-based read performance optimization of CAS system 102 as disclosed herein are illustratively implemented at least in part by or otherwise under the control of read optimization logic 112H, which interacts with read optimization logic 112S of the CAS system 102. One or more such operations can be additionally or alternatively controlled by one or more other system components in other embodiments. Additional details regarding particular implementations of such operations in illustrative embodiments will be provided elsewhere herein.

It should also be noted that the functionality for host-based read performance optimization of CAS system 102 as described herein with reference to host device 101-1 can additionally or alternatively be implemented by each of one or more of the additional host devices 101-2 through 101-N. For example, each of the host devices 101 can be configured to include substantially the same functionality for host-based read performance optimization of CAS system 102 via their respective instances of read optimization logic.

The CAS system 102 is illustratively implemented as a distributed storage system, also referred to herein as a clustered storage system, in which such a storage system comprises a plurality of storage nodes each comprising a set of processing modules configured to communicate with corresponding sets of processing modules on other ones of the storage nodes. The sets of processing modules of the storage nodes of the CAS system 102 collectively comprise at least a portion of the storage controller 108 of the CAS system 102. For example, in some embodiments the sets of processing modules of the storage nodes collectively comprise a distributed storage controller of the distributed storage system.

In the CAS system 102, logical addresses of data pages are mapped to physical addresses of the data pages using respective content-based signatures that are generated from those data pages.

The term "page" as used in this and other contexts herein is intended to be broadly construed so as to encompass any of a wide variety of different types of blocks that may be utilized in a block storage device of a storage system. Different native page sizes are generally utilized in different storage systems of different types. For example, XtremIO™ X1 storage arrays utilize a native page size of 8 KB, while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing data pages of the CAS stem 102.

The content-based signatures utilized in some embodiments illustratively comprise respective hash digests of respective data pages of a storage volume. A given one of the hash digests is generated in illustrative embodiments by applying a secure hashing algorithm to content of a corresponding one of the data pages of the storage volume. For example, a given hash digest can be generated by application of a hash function such as the well-known Secure Hashing Algorithm 1 (SHA1) to the content of its corresponding data page. Other types of secure hashing algorithms, such as SHA2 or SHA256, or more generally other hash functions, can be used in generating content-based signatures herein.

A given hash digest in illustrative embodiments is unique to the particular content of the page from which it is generated, such that two pages with exactly the same content will have the same hash digest, while two pages with different content will have different hash digests. It is also possible that other types of content-based signatures may be used, such as hash handles of the type described elsewhere herein. A hash handle generally provides a shortened representation of its corresponding hash digest. More particularly, the hash handles are shorter in length than respective hash digests that are generated by applying a secure hashing algorithm to respective ones of the data pages. Hash handles are considered examples of "content-based signatures" as that term is broadly used herein.

In some embodiments, various types of address metadata are utilized to provide content addressable storage functionality in the CAS system 102. The address metadata in some embodiments comprises at least a portion of one or more logical layer mapping tables that map logical addresses of respective ones of the data pages of a storage volume to corresponding content-based signatures of the respective data pages. Examples of logical layer mapping tables and other metadata structures maintained by the storage controller 108 of CAS system 102 will be described below.

Also, the term "storage volume" as used herein is intended to be broadly construed, and should not be viewed as being limited to any particular format or configuration.

It is assumed in some embodiments that the processing modules of a distributed storage controller are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller of the type described above can include control modules, data modules, routing modules and at least one management module. These and possibly other modules of the distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

The management module communicates with the control modules, and the control modules communicate with the data modules. In some embodiments, each of the storage nodes of the distributed storage system comprises one of the control modules and one of the data modules, as well as one or more additional modules including one of the routing modules. A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Another example of a CAS system configured to support functionality for host-based read performance optimization will be described in conjunction with FIG. 4 below.

The processing modules of a given distributed storage controller as disclosed herein utilize metadata structures that include logical layer and physical layer mapping tables to be described below. It is to be appreciated that these particular tables are only examples, and other tables or metadata structures having different configurations of entries and fields can be used in other embodiments. The logical layer and physical layer mapping tables in this embodiment illustratively include the following:

1. An address-to-hash ("A2H") table. The A2H table comprises a plurality of entries accessible utilizing logical addresses as respective keys, with each such entry of the A2H table comprising a corresponding one of the logical addresses, a corresponding one of the hash handles, and possibly one or more additional fields.

2. A hash-to-data ("H2D") table that illustratively comprises a plurality of entries accessible utilizing hash handles as respective keys, with each such entry of the H2D table comprising a corresponding one of the hash handles, a physical offset of a corresponding one of the data pages, and possibly one or more additional fields.

3. A hash metadata ("HMD") table illustratively comprising a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table illustratively comprises at least a portion of the same information that is found in the H2D table. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

4. A physical layer based ("PLB") table that illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Again, the logical layer and physical layer mapping tables referred to above are examples only, and can be varied in other embodiments. For example, other types of hash-to-physical ("H2P") mapping tables may be used in addition to or in place of the above-noted HMD and PLB tables.

In some embodiments, certain ones of the above-described mapping tables are maintained by particular modules of a distributed storage controller. For example, the mapping tables maintained by the control modules illustratively comprise at least one A2H table and possibly also at least one H2D table. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein.

The control modules may further comprise additional components such as respective messaging interfaces that are utilized by the control modules to generate control-to-routing messages for transmission to the routing modules, and to process routing-to-control messages received from the routing modules. Such messaging interfaces can also be configured to generate messages for transmission to the management module and to process instructions and other messages received from the management module.

The data modules comprise respective control interfaces. These control interfaces support communication between the data modules and corresponding ones of the control modules. Also included in the data modules are respective SSD interfaces. These SSD interfaces support communications with corresponding ones of the storage devices 106 of the distributed storage system.

The above-described processing module arrangements are presented by way of example only, and can be varied in other embodiments.

In some embodiments, a given data path of the CAS system 102 comprises a control module, a data module and a routing module that are configured to handle different stages of the data path. For example, a given IO request can comprise a write request received in a control module from a routing module.

As indicated above, the CAS system 102 illustratively comprises a plurality of storage nodes interconnected in a mesh network, each such storage node comprising a set of processing modules configured to communicate with corresponding sets of processing modules on other ones of the storage nodes, and a given such set of processing modules comprising at least a routing module, a control module and a data module, with the sets of processing modules of the storage nodes of the CAS system 102 collectively comprising at least a portion of storage controller 108 of the CAS system 102. The storage nodes and their respective sets of processing modules are managed by a system manager, illustratively implemented as a management module within the set of processing modules on at least one of the storage nodes. Each storage node comprises a CPU or other type of processor, a memory, a network interface card (NIC) or other type of network interface, and a subset of the storage devices 106, possibly arranged as part of a disk array enclosure (DAE) of the storage node.

Additional aspects of the host-based read performance optimization functionality implemented by host device 101-1 and CAS system 102 in system 100 of FIG. 1 will now be described in greater detail. As mentioned previously, the host device 101-1 is illustratively configured to maintain the content-based signature cache 116 for a plurality of data pages, and for each of a plurality of read operations to be directed by the host device 101-1 to the CAS system 102, to determine if a data page targeted by the read operation has a corresponding content-based signature in the content-based signature cache 116.

The host device 101-1 in maintaining the content-based signature cache 116 for a plurality of data pages is more particularly configured to send write operations each targeting one or more data pages to the CAS system 102, to receive from the CAS system 102 content-based signatures for respective ones of the data pages, and to store the content-based signatures in the content-based signature cache 116 in association with respective logical addresses of the corresponding data pages. The entries of the content-based signature cache 116 illustratively change over time as additional data pages are written by the host device. It is also possible in some embodiments that data pages can be evicted from the content-based signature cache if they have not been accessed with at least a specified threshold access frequency. Various other well-known techniques for maintaining caches can additionally or alternatively be applied by the host device 101-1 in maintaining the content-based signature cache 116.

The host device 101-1 may receive from the CAS system 102 a content-based signature for a particular one of the data pages by receiving the content-based signature for that data page in an acknowledgement of a corresponding one of the write operations. Such acknowledgements are sent by the CAS system 102 responsive to successful completion of respective write operations, and in accordance with illustrative embodiments can be configured to carry corresponding content-based signatures back to the host device 101-1.

The host device 101-1 in identifying a particular storage node that stores the data page in the CAS system 102 illustratively used the content-based signature of the data page to access a mapping table that maps content-based signatures to respective ones of a plurality of storage nodes that store the data pages in the CAS system 102.

The mapping table illustratively comprises an H2D table of the type described above, which may be configured to map hashes of respective data pages to data modules of respective corresponding storage nodes that store the data pages in the CAS system 102, although other types of signature-to-data mapping tables can be used in other embodiments. The term "mapping table" as used herein is therefore intended to be broadly construed.

The host device 101-1 can obtain the mapping table from the CAS system 102 using at least one command sent by the host device 101-1 to the CAS system 102. For example, the host device can send such a command responsive to expiration of a timer used to define a specified interval for requesting an updated mapping table and/or responsive to a failure of the read operation directed to the identified storage node using the content-based signature to specify the data page targeted by the read operation.

The command illustratively comprises a vendor unique command of a designated storage protocol, such an iSCSI or NVMe protocol. Other types of commands or combinations of multiple commands can be used in other embodiments.

The host device 101-1 in directing the read operation to the identified storage node using the content-based signature to specify the data page targeted by the read operation more particularly directs the read operation to the CAS system 102 in a manner that avoids any need to map a logical address of the data page to a content-based signature of the data page in the CAS system 102.

For example, directing the read operation to the identified storage node using the content-based signature to specify the data page targeted by the read operation illustratively comprises directing the read operation in a manner that bypasses both a routing module and a control module of at least one storage node of the CAS system 102 in reaching a data module of the storage node that stores the data page in the CAS system 102. Such an arrangement advantageously reduces a latency that would have otherwise been incurred in processing of the read operation without bypassing both the routing module and the control module. In addition, inter-module messaging traffic is reduced on the mesh network interconnecting the processing modules of the storage nodes, leading to improved overall performance.

In some embodiments, the host device 101-1 pre-processes read operations to ensure that each such read operation targets a particular data page in the native page size of the CAS system 102. For example, if a given read operation targets multiple data pages each having the native page size, the host device 101-1 can separate that read operation into multiple read operations each targeting a corresponding one of the data pages in the native page size. Each such read operation is then separately processed in the manner previously described. The term "read operation" as broadly used herein is therefore intended to encompass single-page or multiple-page read requests, with a multiple-page request illustratively being viewed as a combination of multiple single-page requests. Such multiple-page requests may be split in the manner described above into separate read requests each in the native page size of the CAS system, and handled separately by the host device 101-1.

These and other operations associated with host-based read performance optimization of the CAS system 102 are illustratively performed at least in part by or under the control of the read optimization logic 112H in host device 101-1. The read optimization logic 112H interacts with the storage controller 108 and its read optimization logic 112S of CAS system 102, illustratively in performing an algorithm such as that shown in the flow diagram of FIG. 3. In other embodiments, the above-described operations can be performed at least in part by components of the host device 101-1 other than the read optimization logic 112H, such as an MPIO driver. However, alternative embodiments of the host device 101-1 of system 100 need not include an MPIO driver.

Figure 2:
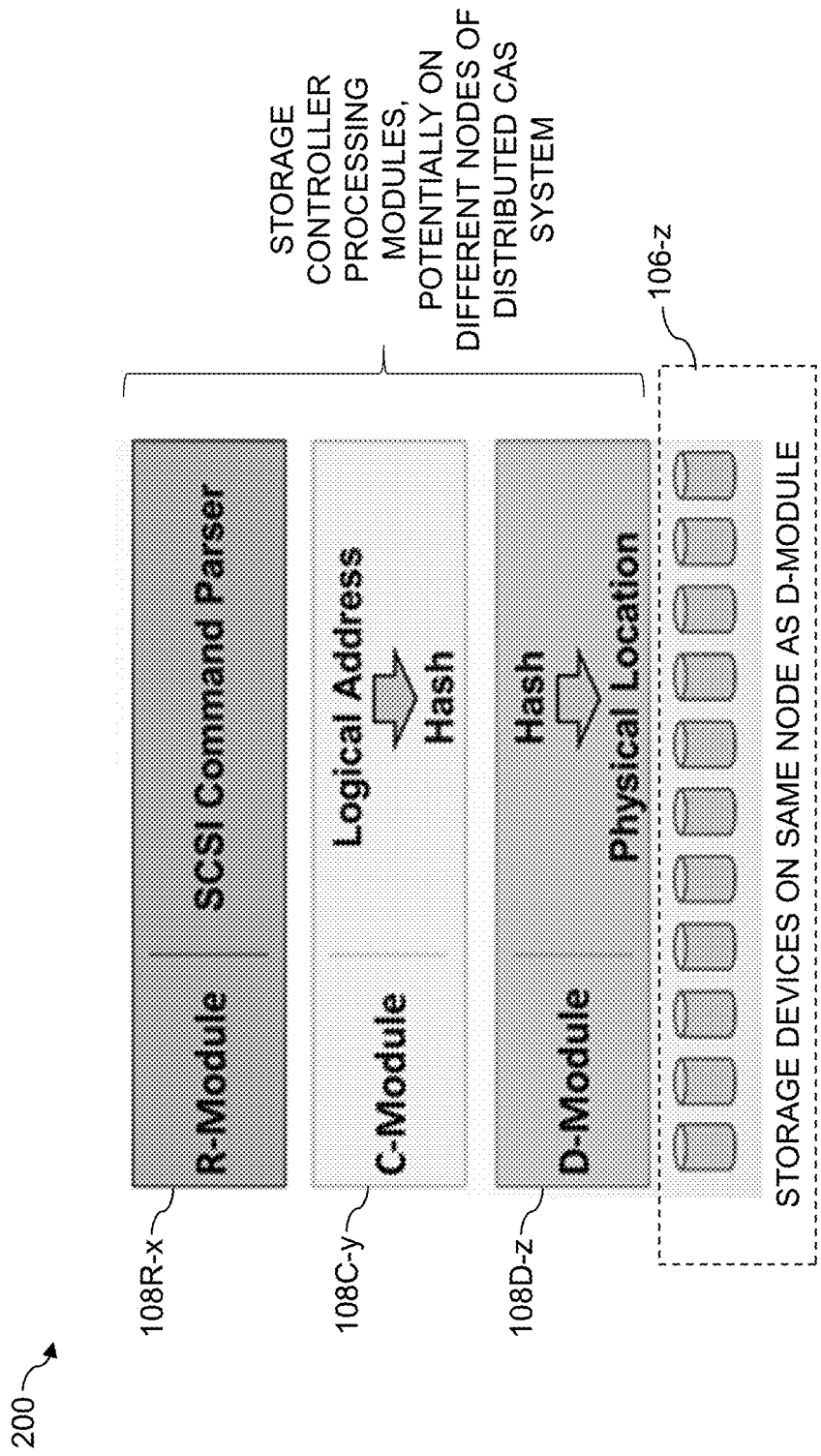
FIG. 2 shows an example relationship between routing, control and data modules of a CAS system in an illustrative embodiment.

An example of the operation of the host device 101-1 and the CAS system 102 in processing read operations will now be described with reference to FIG. 2, which shows the relationship between routing, control and data modules of one possible distributed implantation of CAS system 102 in an illustrative embodiment. More particularly, FIG. 2 illustrates a portion 200 of the CAS system 102, showing a routing module 108R-x, a control module 108C-y and a data module 108D-z in a distributed implementation of the storage controller 108. The routing module 108R-x, a control module 108C-y and a data module 108D-z are also denoted in this embodiment as an R-module, a C-module and a D-module, respectively. These are examples of processing modules of the storage controller 108, and are potentially located on different storage nodes of the distributed CAS system 102. For example, the distributed CAS system 102 illustratively comprises a plurality of storage nodes, as described previously, with each such storage node having at least one R-module, at least one C-module and at least one D-module. It will be assumed for the remainder of the description of this example that the routing module 108R-x, the control module 108C-y and the data module 108D-z are on respective different storage nodes x, y and z of the distributed CAS system 102. The storage node z that implements the D-module 108D-z comprises a subset of the storage devices 106 of the distributed CAS system 102, with the subset of storage devices 106 on storage node z being denoted as storage devices 106-z. Each of the other storage nodes of the distributed CAS system 102 similarly has a different subset of the storage devices 106 associated therewith.

It is assumed in this example that the distributed CAS system 102 manages data using a fixed-size page granularity (e.g., 4 KB, 8 KB or 16 KB), also referred to herein as the native page size of the distributed CAS system 102. A unique hash digest is computed for each of the data pages by content-based signature generator 114, illustratively using SHA1 or another secure hashing algorithm of the type described elsewhere herein.

In the distributed CAS system 102, routing modules such as R-module 108R-x illustratively include a SCSI command parser as shown, although other command parsers for other storage protocols can be used in other embodiments. The routing modules receive IO requests from the host device 101-1, parse the corresponding SCSI commands and route them to the appropriate control modules, which may be located on different storage nodes, illustratively using an address-to-control ("A2C") table. The A2C table maps different portions of a logical address space of the distributed CAS system 102 across different ones of the control modules. A given IO request can be sent by the host device 101-1 to any of the routing modules of the distributed CAS system 102.

The control modules such as control module 108C-y receive the IO requests from the routing modules, and use mapping tables such as the above-described A2H and H2D tables to identify the appropriate data modules that store the corresponding data pages in the distributed CAS system 102. This illustratively includes performing a logical address to hash mapping as shown in the figure.

The data modules such as D-module 108D-z are responsible for the physical storage of the data pages, and use mapping tables such as the above-described HMD and PLB tables to determine the physical location of a given data page in the subset of storage devices associated with that data module, using a hash digest, hash handle or other content-based signature supplied by a control module. This illustratively includes performing a hash to physical location mapping as shown in the figure. Such a hash to physical location mapping can utilize an H2P table of the type described elsewhere herein, illustratively comprising at least portions of the above-noted HMD and PLB tables.

In processing read requests, the C-module 108C-y retrieves from the A2H table the hash digests of the corresponding requested pages, and sends read requests to the appropriate data modules based on the H2D table.

In processing write requests, the C-module 108C-y illustratively computes the hash digests of the data pages based on the write data, sends write requests to the corresponding data modules as determined from the H2D table, and updates the A2H table.

If the host device 101-1 were to send each read request to a particular one of the routing modules, illustratively using random selection or another type of algorithm such as round robin to select a particular routing module for a particular read request, there would likely be multiple "hops" between storage nodes before the request reaches the appropriate storage node that stores the data page. For example, under the above-noted assumption that the routing module 108R-x, the control module 108C-y and the data module 108D-z are on respective different storage nodes x, y and z of the distributed CAS system 102, a read request directed to a data page in a logical address range allocated to storage node y and physically stored in one of the storage devices 106-z of storage node z, if randomly sent by host device 101-1 to the routing module on storage node x, would have to traverse storage node x, storage node y and storage node z before the actual data is reached. As a result, there are three distinct "hops" in this scenario, first from the host device 101-1 to the R-module 108R-x, second from the R-module 108R-x to the C-module 108C-y, and third from the C-module 108C-y to the D-module 108D-z. Each such hop adds to the read request latency, which is a key measure of the performance of the distributed CAS system 102. Accordingly, as indicated elsewhere herein, such processing through multiple storage nodes in order to reach the storage node that actually stores the data can unduly increase the latency of the read operation.

In the present embodiment, the host device 101-1 does not randomly or algorithmically spread read operations across the routing modules of the storage nodes, such as routing module 108R-x on storage node x. Instead, the host device 101-1 uses its read optimization logic 112H and content-based signature cache 116 to provide enhanced processing of such read operations in a manner that substantially reduces read latency by implementing the following example algorithm.

1. As the host device 101-1 writes data pages to the distributed CAS system 102, the storage system provides hash digests of those data pages back to the host device 101-1 in respective acknowledgements of the corresponding write requests.

2. The host device 101-1 maintains the content-based signature cache 116 to include the hash digests received from the distributed CAS system 102. The content-based signature cache 116 in this example comprises a plurality of entries of the form {logical address, hash digest} for respective ones of a plurality of data pages currently represented in the content-based signature cache 116.

3. The host device 101-1 stores an H2D table that can be used to map hash digests from the content-based signature cache to the specific storage node that contains the data module that physically stores the corresponding data page. The host device 101-1 illustratively obtains the H2D table from the distributed CAS system 102 using a vendor unique command or other type of command of a particular storage protocol.

4. When the host device 101-1 wants to issue a read request to the distributed CAS system 102, it will first check if the logical address of the data page is found in its content-based signature cache 116. If the logical address of the data page is found in the cache, instead of reading the data page in the normal way using the logical address, the host device 101-1 will instead read the data page using the associated hash digest, in a read command sent directly to the specific storage node that has ownership of the data page. Therefore, instead of sending the read request to an arbitrary R-module, the host device 101-1 will send the read request to the actual final destination D-module that "owns" the data page. If the logical address of the data page is not found in the cache, the host device 101-1 will issue a normal read request, which will be sent to an arbitrary R-module in the manner previously described.

This process advantageously allows the host device 101-1 to send read requests directly to the specific storage node that includes the data module that owns the data page. As a result, the number of hops required to reach the data page is reduced to just one, from the host device 101-1 to the final destination storage node with the data module that owns the data page, substantially reducing read latency. This also indirectly reduces both processor utilization and network bandwidth consumption, for example, by avoiding storage node CPU cycles and associated network messaging that would otherwise be consumed in the R→C→D→C→R traversal of the storage nodes, thereby improving overall system performance.

The above process steps can be varied in other embodiments, and certain steps can overlap with other steps. The sequential ordering is used for clarity and simplicity of presentation only, rather than by way of limitation.

It should be noted that the H2D table can change over time, and therefore the host device 101-1 may need to obtain an updated H2D table from the distributed CAS system 102 under certain conditions. For example, when a storage node fails, the distributed CAS system 102 may perform a failover flow where the responsibility of the failed storage node is divided between the other storage nodes. Similarly, when a failed storage node is replaced with a new storage node, a failback flow will assign new ownerships to the new storage node. Another example is during cluster expansion, where new storage nodes are added to the distributed CAS system 102 and take responsibility from other storage nodes. In such cases, a read request may fail, either because the destination storage node has failed, or the targeted data was moved to another storage node and will not be found by the destination storage node. Upon such a failure of a read request, the host device 101-1 may send a request for an updated H2D table to the distributed CAS system 102, determine a new destination storage node using the updated H2D table, and reissue the read request to the new destination storage node.

The particular example described above in conjunction with FIG. 2 should not be construed as limiting in any way, and a wide variety of other implementations of the CAS system 102 are possible.

The CAS system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources.

As indicated previously, the host device 101-1 and possibly the other host devices 101-2 through 101-N may be implemented in whole or in part on the same processing platform as the CAS system 102 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host device 101-1 and the CAS system 102 to reside in different data centers. Numerous other distributed implementations of the host device 101-1 and the CAS system 102 are possible.

Additional examples of processing platforms utilized to implement host devices 101 and CAS system 102 in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 101, CAS system 102, network 104, storage devices 106, storage controller 108, storage volumes 110, read optimization logic instances 112, content-based signature generator 114, content-based signature cache 116, processor 120 and memory 122 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, although in some embodiments the read optimization logic 112H is implemented within an MPIO driver of the host device 101-1, this is by way of example only, and in other embodiments the host device 101-1 need not include an MPIO driver. Embodiments of this type can instead implement the read optimization logic 112H elsewhere in the host device 101-1, such as in the form of one or more processes stored in the memory 122 and executed by the processor 120.

The operation of the information processing system 100 will now be described in further detail with reference to the flow diagram of the illustrative embodiment of FIG. 3, which implements a process for host-based read performance optimization of a CAS system. The process illustratively comprises an algorithm implemented at least in part by the read optimization logic 112H of host device 101-1, operating in cooperation with the corresponding read optimization logic 112S of CAS system 102.

Figure 3:
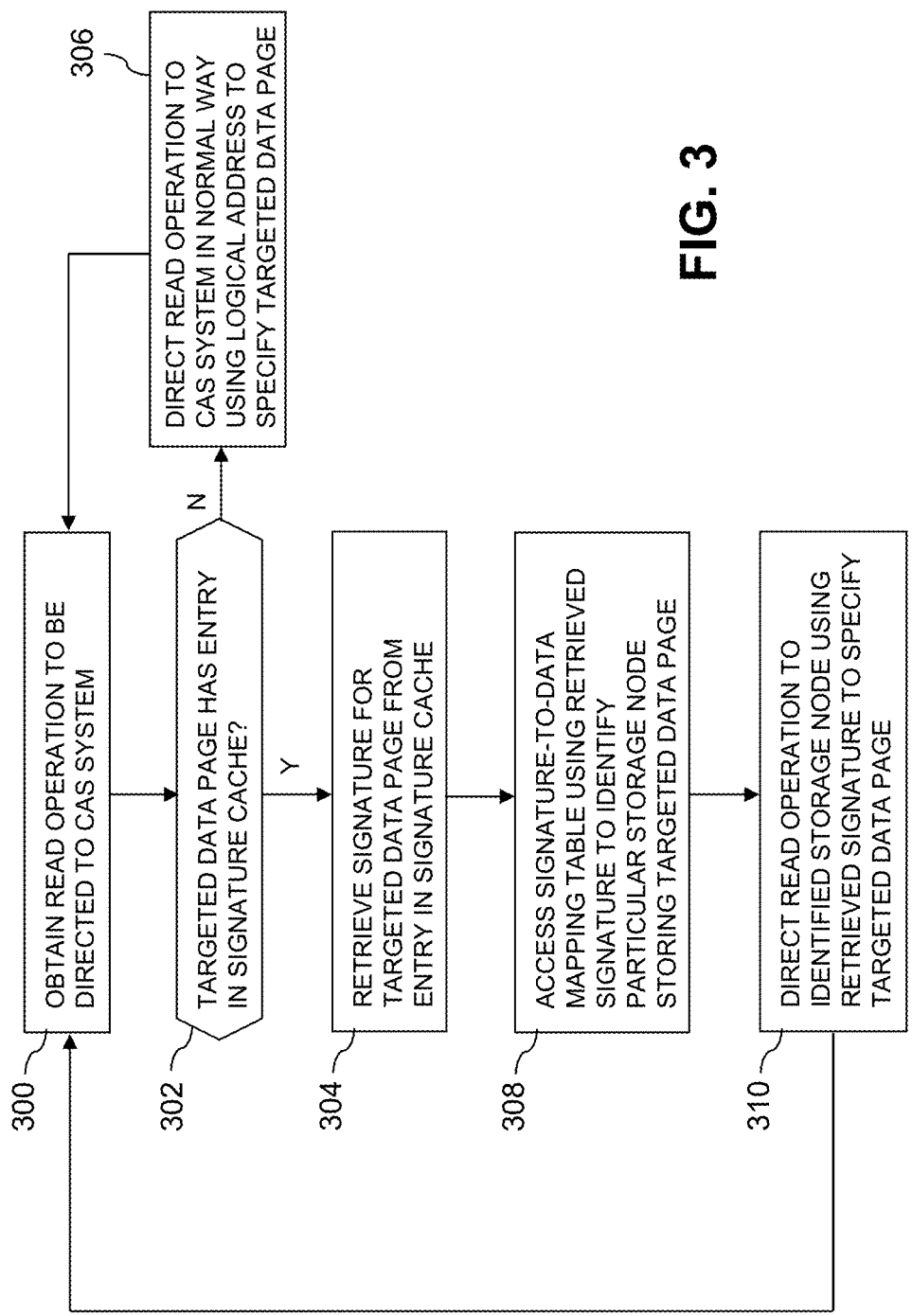
FIG. 3 is a flow diagram of a process for host-based read performance optimization of a CAS system in an illustrative embodiment.

The process as illustrated in FIG. 3 includes steps 300 through 310, and is described in the context of host device 101-1 of system 100 but is more generally applicable to a wide variety of other types of information processing systems comprising at least one host device and at least one CAS system.

In step 300, a read operation is obtained in the host device 101-1 from an executing application process, such as one of the application processes 124 executing on the processor 120 of the host device 101-1. Additionally or alternatively, the read operation can be obtained by selecting it from one of the IO queues 126 into which it was placed when generated by an executing application process. It is assumed for this embodiment that the read operation targets a single data page in a native page size of the CAS system 102. If the read operation is not already so configured when initially obtained, it can be preprocessed by the host device 101-1 in the manner described elsewhere herein in order to ensure that it targets a single data page in the native page size. For example, the host device 101-1 can separate a read operation targeting multiple data pages each in the native page size into multiple read operations each targeting a corresponding one of the multiple data pages.

In step 302, the host device 101-1 determines if the data page targeted by the read operation has a corresponding entry in the content-based signature cache 116. As indicated above, the content-based signature of a given data page illustratively comprises a hash digest generated by applying a content-based signature generation algorithm, such as an SHA1, SHA2 or SHA256 secure hashing algorithm, to the data page using the content-based signature generator 114 of the CAS system 102. The resulting hash digest is also referred to herein as simply a "hash" of the data page. The hash digests or other content-based signatures are illustratively received by the host device 101-1 from the CAS system 102, possibly in acknowledgements sent by the CAS system 102 responsive to write operations targeting those same data pages and previously sent by the host device 101-1 to the CAS system 102. Other techniques can be used by the host device 101-1 to obtain the content-based signatures for its content-based signature cache 116. For example, the host device 101-1 can read content-based signatures from the CAS system 102 using various types of commands. If the host device in step 302 determines that the targeted data page has an entry in the content-based signature cache 116, the process moves to step 304, and otherwise moves to step 306 as indicated.

In step 304, the host device 101-1 retrieves the content-based signature for the targeted data page from the entry in the content-based signature cache 116. The process then moves to step 308 as indicated.

In step 306, which is reached if the targeted data page does not have an entry in the content-based signature cache 116, the host 101-1 directs the read operation to the CAS system 102 in the normal way, illustratively using a logical block address to specify the targeted data page of the read operation. The process then returns to step 300 as shown in order to process another read operation.

In step 308, the host device 101-1 accesses a signature-to-data mapping table using the retrieved content-based signature in order to identify a particular storage node that stores the targeted data page. The signature-to-data mapping table illustratively comprises an H2D table of the type described elsewhere herein, although other types of mapping tables can be used in other embodiments. Such a mapping table is used in some embodiments by a control module to identify a particular data module that is responsible for physical storage of a data page having a particular content-based signature. The host device 101-1 illustratively obtains the H2D table from the CAS system 102 by sending at least one command to the CAS system 102 that requests the H2D table. The command in some embodiments comprises a vendor unique command of a designated storage protocol, such as a SCSI protocol or an NVMe protocol, although other types of commands can be used.

In step 310, the host device 101-1 directs the read operation to the identified storage node using the retrieved content-based signature to specify the targeted data page. The process then returns to step 300 as shown in order to process another read operation.

It should be noted that steps 300 through 310 could be iterated for respective ones of multiple read operations. Also, different portions of the process can overlap with other portions of the process. For example, additional iterations of some of the steps can be initiated while previous iterations of other ones of the steps are still in progress. Accordingly, the steps are shown in sequential order for clarity and simplicity of illustration only, and certain steps can at least partially overlap with other steps.

The particular processing operations and other system functionality described in conjunction with the flow diagram of FIG. 3 are presented by way of illustrative example only, and should not be construed as limiting the scope of the disclosure in any way. Alternative embodiments can use other types of processing operations for host-based read performance optimization of a CAS system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different host-based read performance optimization processes for respective different read operations or for different host devices, storage systems or portions thereof within a given information processing system.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, one or more host devices such as host devices 101 in system 100 that are each configured to perform the steps of the FIG. 3 process can be implemented as part of what is more generally referred to herein as a processing platform comprising one or more processing devices each comprising a processor coupled to a memory.

Similarly, a storage controller such as storage controller 108 of CAS system 102 in system 100 that is configured to interact with the one or more host devices such as host devices 101 in conjunction with their respective performance of the FIG. 3 process can be implemented as part of a processing platform comprising one or more processing devices each comprising a processor coupled to a memory, possibly the same processing platform that implements one or more of the host devices 101.

A given such processing device may correspond to one or more virtual machines or other types of virtualization infrastructure such as Docker containers or Linux containers (LXCs). The host devices 101, storage controller 108, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

In some embodiments, a given CAS system comprises a clustered CAS system configured to support host-based read performance optimization functionality as disclosed herein. A clustered CAS system is also referred to herein as a distributed CAS system. A "distributed CAS system" as that term is broadly used herein includes any CAS system that is distributed across multiple storage nodes.

An illustrative embodiment of such a CAS system will now be described with reference to FIG. 4. In this embodiment, a CAS system 402 comprises a plurality of storage devices 406 and an associated storage controller 408. The CAS system 402 may be viewed as a particular implementation of the CAS system 102, and accordingly is assumed to be coupled to host devices 101 via network 104 in system 100.

The storage controller 408 in the present embodiment is configured to support host-based read performance optimization functionality of the type previously described in conjunction with FIGS. 1 through 3. For example, the CAS system 402 illustratively interacts with one or more host devices 101 to support performance of a process such as that shown in FIG. 3, in order to achieve host-based read performance optimization of the CAS system 402.

The storage controller 408 includes distributed modules 412 and 414, which are configured to operate in a manner similar to that described above for respective corresponding read optimization logic 112S and content-based signature generator 114 of the storage controller 108 of system 100. Module 412 is more particularly referred to as distributed read optimization logic, and illustratively comprises multiple read optimization logic instances on respective ones of a plurality of distinct nodes, with the multiple read optimization logic instances collectively supporting host-based read performance optimization functionality as disclosed herein. Module 414 more particularly comprises a distributed signature generator with different instances thereof also being implemented on respective ones of the distinct nodes.

Figure 4:
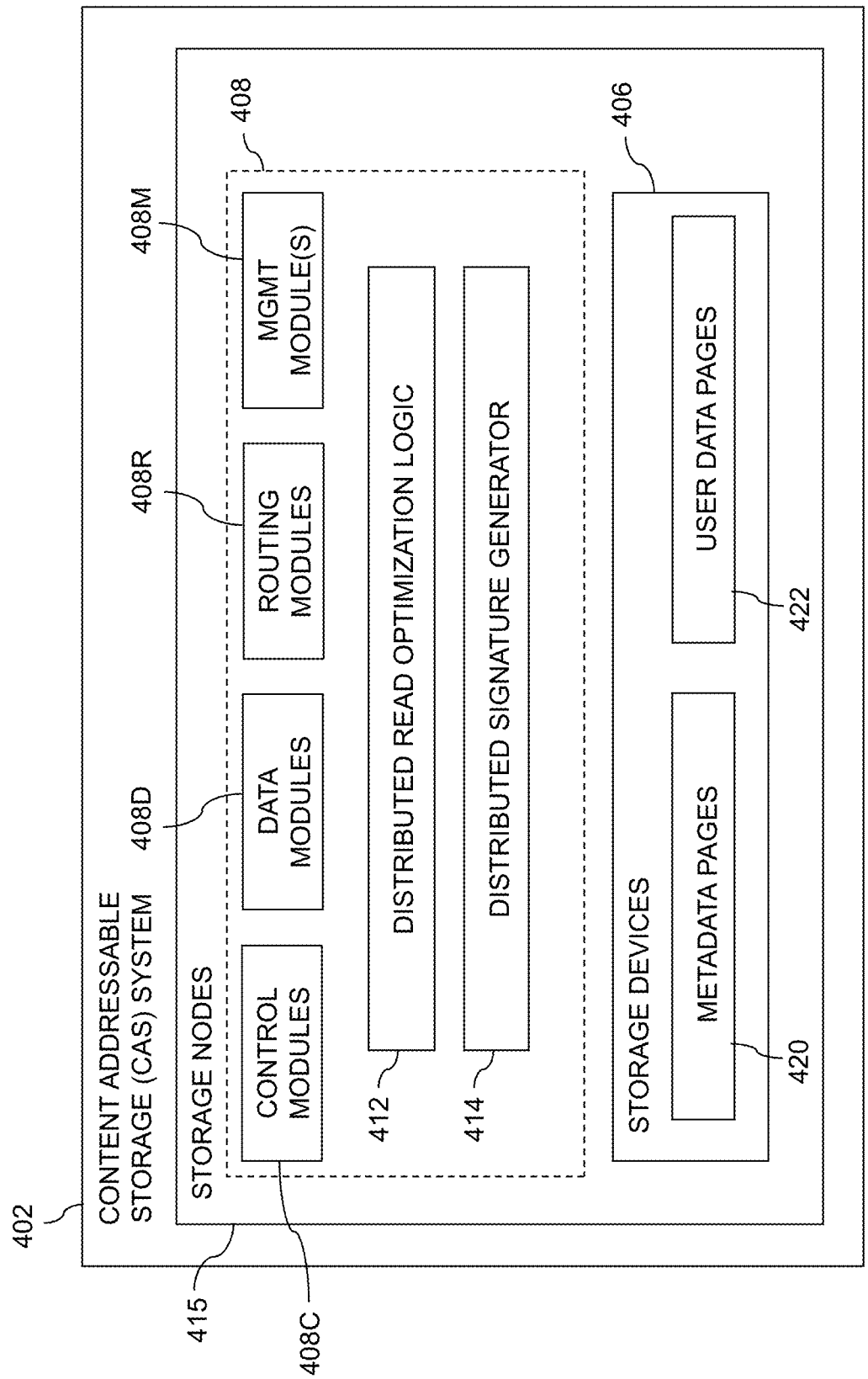
FIG. 4 shows a CAS system having a distributed storage controller configured to support host-based read performance optimization functionality in an illustrative embodiment.

The CAS system 402 in the FIG. 4 embodiment is implemented as at least a portion of a clustered storage system and includes a plurality of storage nodes 415 each comprising a corresponding subset of the storage devices 406. Such storage nodes 415 are examples of the "distinct nodes" referred to above, and other clustered storage system arrangements comprising multiple storage nodes and possibly additional or alternative nodes can be used in other embodiments. A given clustered storage system may therefore include not only storage nodes 415 but also additional storage nodes, compute nodes or other types of nodes coupled to network 104. Alternatively, such additional storage nodes may be part of another clustered storage system of the system 100. Each of the storage nodes 415 of the CAS system 402 is assumed to be implemented using at least one processing device comprising a processor coupled to a memory.

The storage controller 408 of the CAS system 402 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 is referred to as distributed storage controller 408.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the CAS system 402.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415. A given set of processing modules implemented on a particular one of the storage nodes 415 therefore illustratively includes at least one control module 408C, at least one data module 408D and at least one routing module 408R, and possibly a management module 408M.

Communication links may be established between the various processing modules of the distributed storage controller 408 using well-known communication protocols such as TCP/IP and remote direct memory access (RDMA). For example, respective sets of IP links used in data transfer and corresponding messaging could be associated with respective different ones of the routing modules 408R.

Although shown as separate modules of the distributed storage controller 408, the modules 412 and 414 in the present embodiment are assumed to be distributed at least in part over at least a subset of the other modules 408C, 408D, 408R and 408M of the storage controller 408. Accordingly, at least portions of the functionality for host-based read performance optimization of a CAS system of the modules 412 and 414 may be implemented in one or more of the other modules of the storage controller 408. In other embodiments, the modules 412 and 414 may be implemented as stand-alone modules of the storage controller 408.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users of the CAS system 402. Each such LUN may comprise particular ones of the above-noted pages of the user data area. The user data stored in the user data pages 422 can include any type of user data that may be utilized in the system 100. The term "user data" herein is therefore also intended to be broadly construed.

A given storage volume for which content-based signatures are generated using modules 412 and 414 illustratively comprises a set of one or more LUNs, each including multiple ones of the user data pages 422 stored in storage devices 406.

The CAS system 402 in the embodiment of FIG. 4 is configured to generate hash metadata providing a mapping between content-based digests of respective ones of the user data pages 422 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 422. The hash metadata generated by the CAS system 402 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, in a given set of n user data pages representing a portion of the user data pages 422, each of the user data pages is characterized by a LUN identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages having respective signatures. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the CAS system 402 is illustratively distributed among the control modules 408C.

The functionality for host-based read performance optimization of a CAS system provided by modules 412 and 414 in this embodiment is assumed to be distributed across multiple distributed processing modules, including at least a subset of the processing modules 408C, 408D, 408R and 408M of the distributed storage controller 408.

For example, the management module 408M of the storage controller 408 may include a read optimization logic instance that engages corresponding read optimization logic instances in all of the control modules 408C and routing modules 408R in order to support host-based read performance optimization of the CAS system 402.

By way of example, in some embodiments, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

The distributed storage controller in this example is configured to group consecutive pages into page groups, to arrange the page groups into slices, and to assign the slices to different ones of the control modules 408C. For example, if there are 1024 slices distributed evenly across the control modules 408C, and there are a total of 16 control modules in a given implementation, each of the control modules "owns" 1024/16=64 slices. In such arrangements, different ones of the slices are assigned to different ones of the control modules 408C such that control of the slices within the storage controller 408 of the CAS system 402 is substantially evenly distributed over the control modules 408C of the storage controller 408.

The data modules 408D allow a user to locate a given user data page based on its signature. Each metadata page also has a size of 8 KB and includes multiple instances of the <lun_id, offset, signature> for respective ones of a plurality of the user data pages. Such metadata pages are illustratively generated by the control modules 408C but are accessed using the data modules 408D based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the data module. This metadata page will include the <lun_id, offset, signature> for the user data page if the user page exists. The signature of the user data page is then used to retrieve that user data page, also via the data module.

Write requests processed in the CAS system 402 each illustratively comprise one or more IO operations directing that at least one data item of the CAS system 402 be written to in a particular manner. A given write request is illustratively received in the CAS system 402 from a host device over a network. In some embodiments, a write request is received in the distributed storage controller 408 of the CAS system 402, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In some embodiments, the control modules 408C, data modules 408D and routing modules 408R of the storage nodes 415 communicate with one another over a high-speed internal network such as an InfiniBand network. The control modules 408C, data modules 408D and routing modules 408R coordinate with one another to accomplish various IO processing tasks.

The write requests from the host devices identify particular data pages to be written in the CAS system 402 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The CAS system 402 utilizes a two-level mapping process to map logical block addresses to physical block addresses. The first level of mapping uses an A2H table and the second level of mapping uses an HMD table, with the A2H and HMD tables corresponding to respective logical and physical layers of the content-based signature mapping within the CAS system 402. The HMD table or a given portion thereof in some embodiments disclosed herein is more particularly referred to as an H2D table, although it is to be understood that these and other mapping tables or other data structures referred to herein can be varied in other embodiments.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 406. This is also referred to as physical layer mapping.

Examples of these and other metadata structures utilized in illustrative embodiments were described elsewhere herein. These particular examples illustratively include respective A2H, H2D, HMD and PLB tables. In some embodiments, the A2H and H2D tables are utilized primarily by the control modules 408C, while the HMD and PLB tables are utilized primarily by the data modules 408D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the CAS system 402. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the CAS system 402 correspond to respective physical blocks of a physical layer of the CAS system 402. The user data pages of the logical layer are organized by LBA and have reference via respective content-based signatures to particular physical blocks of the physical layer.

Each of the physical blocks has an associated reference count that is maintained within the CAS system 402. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement functionality for host-based read performance optimization of a CAS system in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a CAS system can be used in other embodiments.

Illustrative embodiments of a storage system with functionality for host-based read performance optimization of a CAS system as disclosed herein can provide a number of significant advantages relative to conventional arrangements.

For example, these embodiments advantageously avoid the need to process a given read operation through multiple storage nodes of a distributed CAS system in order to reach the particular storage node that actually stores the data.

More particularly, some embodiments are configured to ensure that a read operation directed to a particular data page of a given logical storage volume of a distributed CAS system is automatically directed to the appropriate storage node that stores that data page, thereby avoiding multiple hops between multiple different storage nodes of the distributed CAS system, and substantially reducing the latency of the read operation.

Accordingly, these and other embodiments can substantially accelerate the processing of read operations by the CAS system.

Such arrangements provide a significant advance over conventional approaches in which multiple hops between different storage nodes are typically required in processing each of a plurality of read operations.

In addition, some embodiments significantly reduce the inter-module messaging traffic carried over a mesh network interconnecting the processing modules of the storage nodes of a distributed CAS system, thereby reducing processor utilization and network congestion, and improving overall system performance.

Furthermore, illustrative embodiments herein do not significantly undermine the performance of the storage system in handling normal IO requests not subject to host-based read performance optimization as disclosed herein.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for host-based read performance optimization of a CAS system will now be described in greater detail with reference to FIGS. 5 and 6. Although described in the context of system 100, these platforms may also be used to implement at least portions of other information processing systems in other embodiments.

Figure 5:
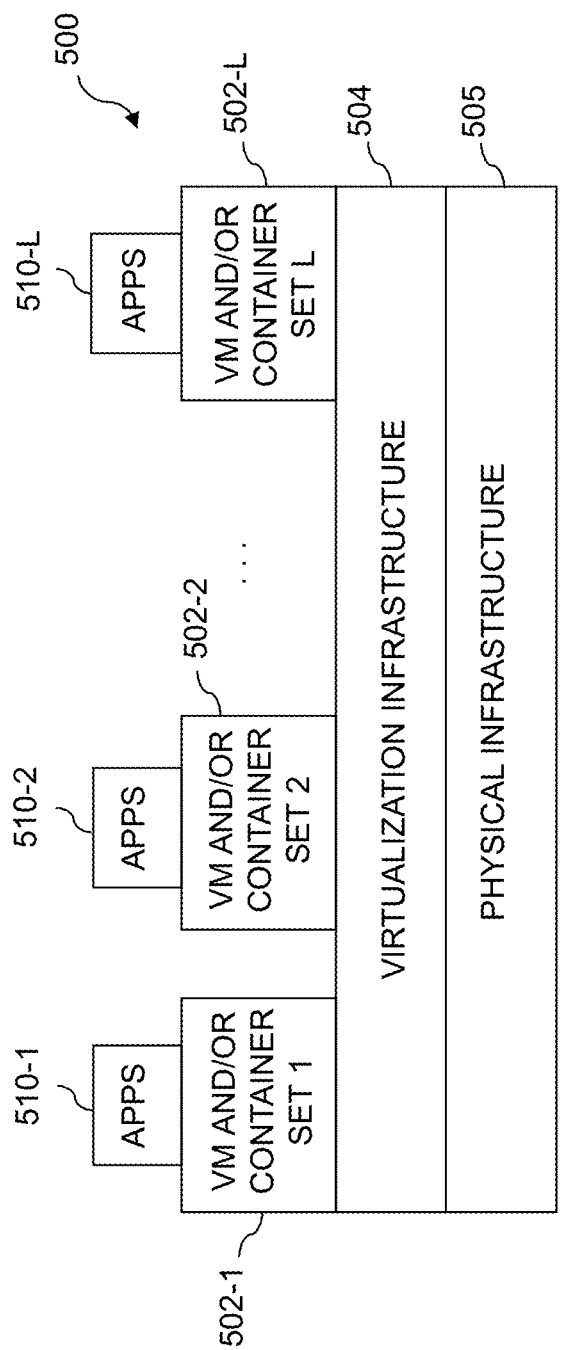
FIGS. 5 and 6 show examples of processing platforms that may be utilized to implement at least a portion of an information processing system in illustrative embodiments.
Figure 6:
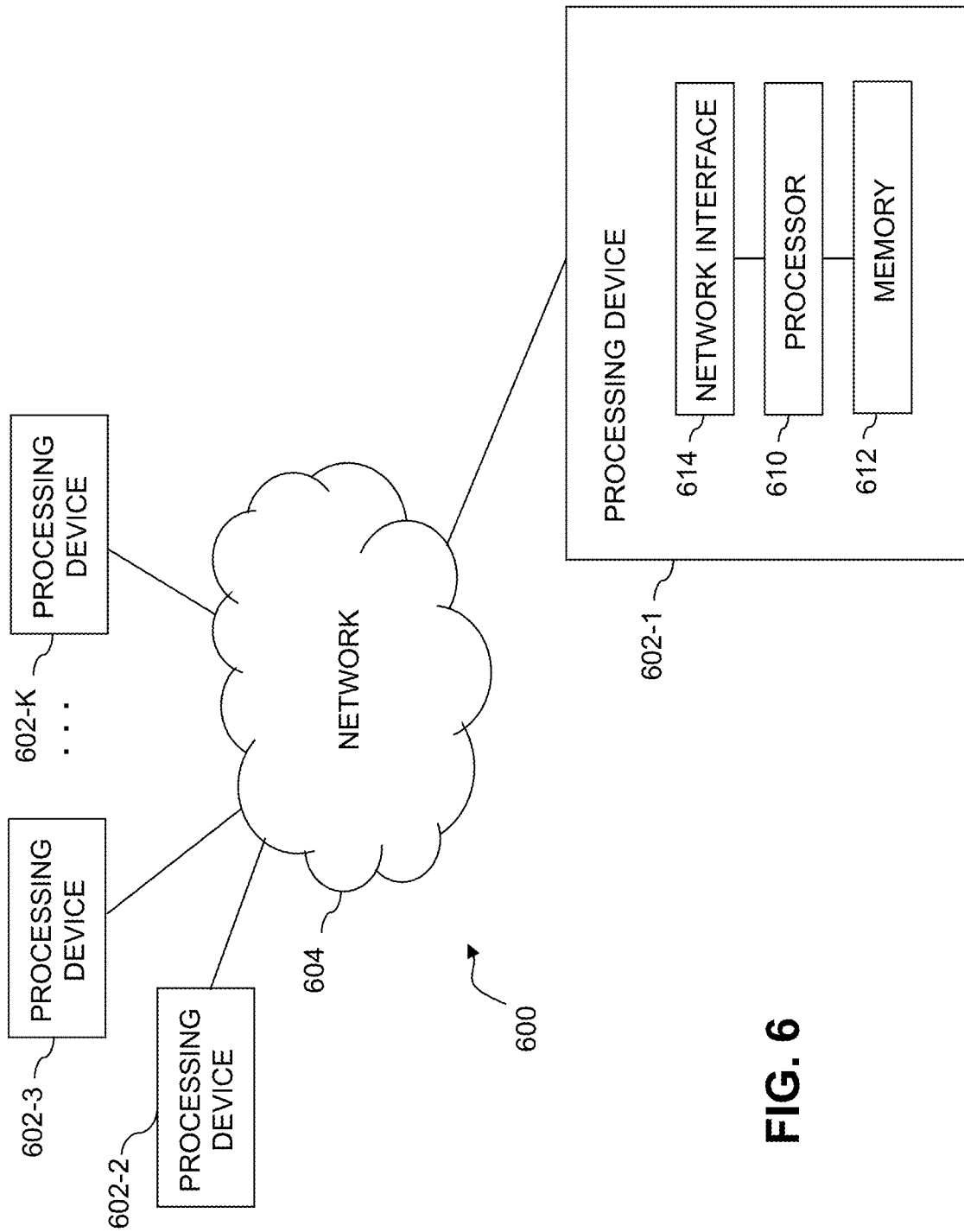

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide functionality for host-based read performance optimization of a CAS system of the type described above using one or more processes running on a given one of the VMs. For example, each of the VMs can implement read optimization logic instances and/or other components for supporting functionality for host-based read performance optimization of the CAS system 102 in the system 100.

A hypervisor platform may be used to implement a hypervisor within the virtualization infrastructure 504. Such a hypervisor platform may comprise an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide functionality for host-based read performance optimization of a CAS system of the type described above. For example, a container host device supporting multiple containers of one or more container sets can implement one or more instances of read optimization logic and/or other components for supporting functionality for host-based read performance optimization of a CAS system in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, ... 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for host-based read performance optimization of a CAS system of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, read optimization logic instances, signature generators, signature caches and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
said at least one processing device being configured:
to maintain in a host device a content-based signature cache for a plurality of data pages; and for each of a plurality of read operations to be directed from the host device to a distributed content addressable storage system that is separate from the host device:
  to determine if a data page targeted by the read operation has a corresponding content-based signature in the content-based signature cache; and
  responsive to the data page having a content-based signature in the content-based signature cache:
    to identify a particular storage node that stores the data page in the distributed content addressable storage system; and
    to direct the read operation to the identified storage node using the content-based signature to specify the data page targeted by the read operation;
  wherein identifying a particular storage node that stores the data page in the distributed content addressable storage system comprises using the content-based signature of the data page to access a mapping table that maps content-based signatures to respective ones of a plurality of storage nodes that store the data pages in the distributed content addressable storage system.

2. The apparatus of claim 1 wherein the content-based signatures comprise respective hash digests of respective data pages with a given one of the hash digests being generated by applying a secure hashing algorithm to content of a corresponding one of the data pages.

3. The apparatus of claim 1 wherein said at least one processing device comprises at least a portion of the host device, and further wherein the host device is configured to communicate with the distributed content addressable storage system over at least one network.

4. The apparatus of claim 1 wherein the content-based signature cache comprises a plurality of entries for respective data pages with each such entry comprising a logical address of its data page and a corresponding content-based signature of that data page.

5. The apparatus of claim 1 wherein maintaining a content-based signature cache for a plurality of data pages comprises:
  sending write operations each targeting one or more data pages to the distributed content addressable storage system;
  receiving from the distributed content addressable storage system content-based signatures for respective ones of the data pages; and
  storing the content-based signatures in the content-based signature cache in association with respective logical addresses of the corresponding data pages.

6. The apparatus of claim 5 wherein receiving from the distributed content addressable storage system a content-based signature for a particular one of the data pages comprises receiving the content-based signature for that data page in an acknowledgement of a corresponding one of the write operations.

7. The apparatus of claim 1 wherein the mapping table comprises a hash-to-data mapping table that maps hashes of respective data pages to data modules of respective corresponding storage nodes that store the data pages in the distributed content addressable storage system.

8. The apparatus of claim 1 wherein the mapping table is obtained from the distributed content addressable storage system using at least one command sent by the processing device to the distributed content addressable storage system, wherein said command is sent responsive to at least one of:
  an expiration of a timer used to define a specified interval for requesting an updated mapping table; and
  a failure of the read operation directed to the identified storage node using the content-based signature to specify the data page targeted by the read operation.

9. The apparatus of claim 8 wherein the command comprises a vendor unique command of a designated storage protocol.

10. The apparatus of claim 1 wherein directing the read operation to the identified storage node using the content-based signature to specify the data page targeted by the read operation comprises directing the read operation in a manner that avoids any need to map a logical address of the data page to a content-based signature of the data page in the distributed content addressable storage system.

11. The apparatus of claim 1 wherein directing the read operation to the identified storage node using the content-based signature to specify the data page targeted by the read operation comprises directing the read operation in a manner that bypasses both a routing module and a control module of at least one storage node of the distributed content addressable storage system in reaching a data module of the storage node that stores the data page in the distributed content addressable storage system, thereby reducing a latency that would have otherwise been incurred in processing of the read operation without bypassing both the routing module and the control module.

12. The apparatus of claim 1 wherein said at least one processing device is further configured, responsive to the data page not having a content-based signature in the content-based signature cache, to direct the read operation to the distributed content addressable storage system without identifying a particular storage node that stores the data page in the distributed content addressable storage system and without using the content-based signature to specify the data page targeted by the read operation.

13. An apparatus comprising:
  at least one processing device comprising a processor coupled to a memory;
  said at least one processing device being configured:
    to maintain in a host device a content-based signature cache for a plurality of data pages; and
    for each of a plurality of read operations to be directed from the host device to a distributed content addressable storage system that is separate from the host device:
      to determine if a data page targeted by the read operation has a corresponding content-based signature in the content-based signature cache; and
      responsive to the data page having a content-based signature in the content-based signature cache:
        to identify a particular storage node that stores the data page in the distributed content addressable storage system; and
        to direct the read operation to the identified storage node using the content-based signature to specify the data page targeted by the read operation;
    wherein the distributed content addressable storage system comprises a plurality of storage nodes interconnected in a mesh network, each such storage node comprising a set of processing modules configured to communicate with corresponding sets of processing modules on other ones of the storage nodes, a given such set of processing modules comprising at least two or more of a routing module, a control module and a data module, the sets of processing modules of the storage nodes of the distributed content addressable storage system collectively comprising at least a portion of a storage controller of the distributed content addressable storage system.

14. A method comprising:
maintaining in a host device a content-based signature cache for a plurality of data pages; and
for each of a plurality of read operations to be directed from the host device to a distributed content addressable storage system that is separate from the host device:
determining if a data page targeted by the read operation has a corresponding content-based signature in the content-based signature cache; and
responsive to the data page having a content-based signature in the content-based signature cache:
identifying a particular storage node that stores the data page in the distributed content addressable storage system; and
directing the read operation to the identified storage node using the content-based signature to specify the data page targeted by the read operation;
wherein identifying a particular storage node that stores the data page in the distributed content addressable storage system comprises using the content-based signature of the data page to access a mapping table that maps content-based signatures to respective ones of a plurality of storage nodes that store the data pages in the distributed content addressable storage system; and
wherein the method is implemented by at least one processing device comprising a processor coupled to a memory.

15. The method of claim 14 wherein the content-based signature cache comprises a plurality of entries for respective data pages with each such entry comprising a logical address of its data page and a corresponding content-based signature of that data page.

16. The method of claim 14 wherein maintaining a content-based signature cache for a plurality of data pages comprises:
sending write operations each targeting one or more data pages to the distributed content addressable storage system;
receiving from the distributed content addressable storage system content-based signatures for respective ones of the data pages; and
storing the content-based signatures in the content-based signature cache in association with respective logical addresses of the corresponding data pages.

17. The method of claim 14 wherein the mapping table comprises a hash-to-data mapping table that maps hashes of respective data pages to data modules of respective corresponding storage nodes that store the data pages in the distributed content addressable storage system.

18. A computer program product comprising a non-transitory processor-readable storage medium having stored therein program code of one or more software programs, wherein the program code when executed by at least one processing device causes said at least one processing device:
to maintain in a host device a content-based signature cache for a plurality of data pages; and
for each of a plurality of read operations to be directed from the host device to a distributed content addressable storage system that is separate from the host device:
to determine if a data page targeted by the read operation has a corresponding content-based signature in the content-based signature cache; and
responsive to the data page having a content-based signature in the content-based signature cache:
to identify a particular storage node that stores the data page in the distributed content addressable storage system; and
to direct the read operation to the identified storage node using the content-based signature to specify the data page targeted by the read operation;
wherein identifying a particular storage node that stores the data page in the distributed content addressable storage system comprises using the content-based signature of the data page to access a mapping table that maps content-based signatures to respective ones of a plurality of storage nodes that store the data pages in the distributed content addressable storage system.

19. The computer program product of claim 18 wherein the content-based signature cache comprises a plurality of entries for respective data pages with each such entry comprising a logical address of its data page and a corresponding content-based signature of that data page.

20. The computer program product of claim 18 wherein maintaining a content-based signature cache for a plurality of data pages comprises:
sending write operations each targeting one or more data pages to the distributed content addressable storage system;
receiving from the distributed content addressable storage system content-based signatures for respective ones of the data pages; and
storing the content-based signatures in the content-based signature cache in association with respective logical addresses of the corresponding data pages.

* * * * *